(No Model.) 3 Sheets—Sheet 3.
W. H. CLAY & J. H. KNOWLES.
METALLIC TOOTHED CYLINDER FOR CARDING OR SIMILAR MACHINES.
No. 542,605. Patented July 9, 1895.
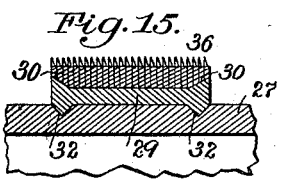
Fig. 15.
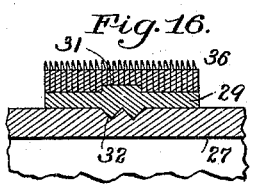
Fig. 16.
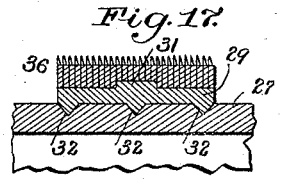
Fig. 17.
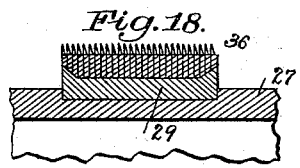
Fig. 18.
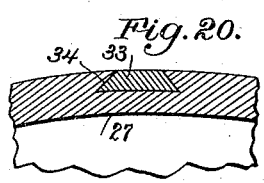
Fig. 20.
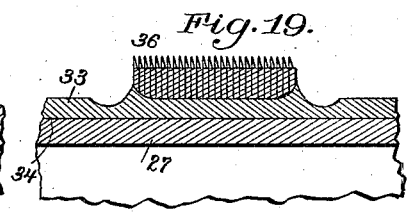
Fig. 19.
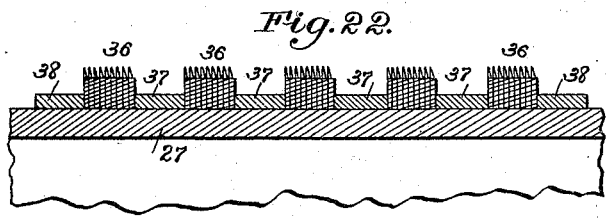
Fig. 22.
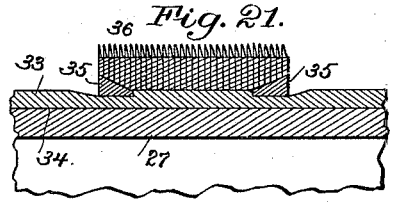
Fig. 21.
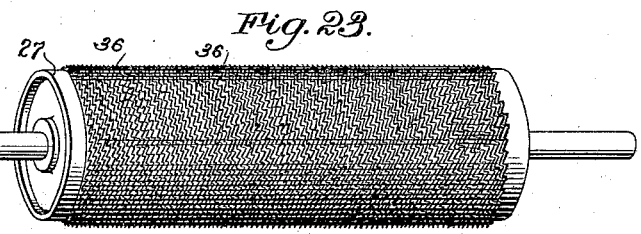
Fig. 23.
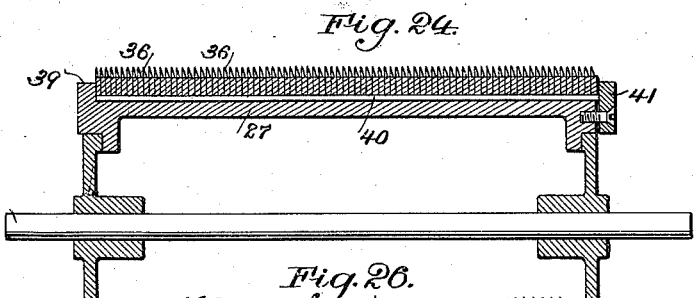
Fig. 24.
Fig. 25.
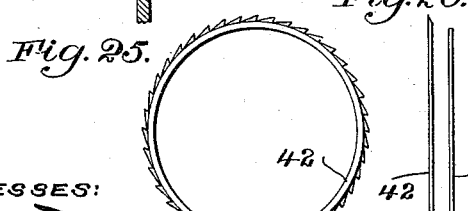
Fig. 26.
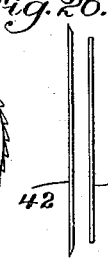
Fig. 27.
WITNESSES:
Henry Burny
Wm. L. Evans
INVENTORS
Wm. H. Clay
John Henry Knowles
By their atty

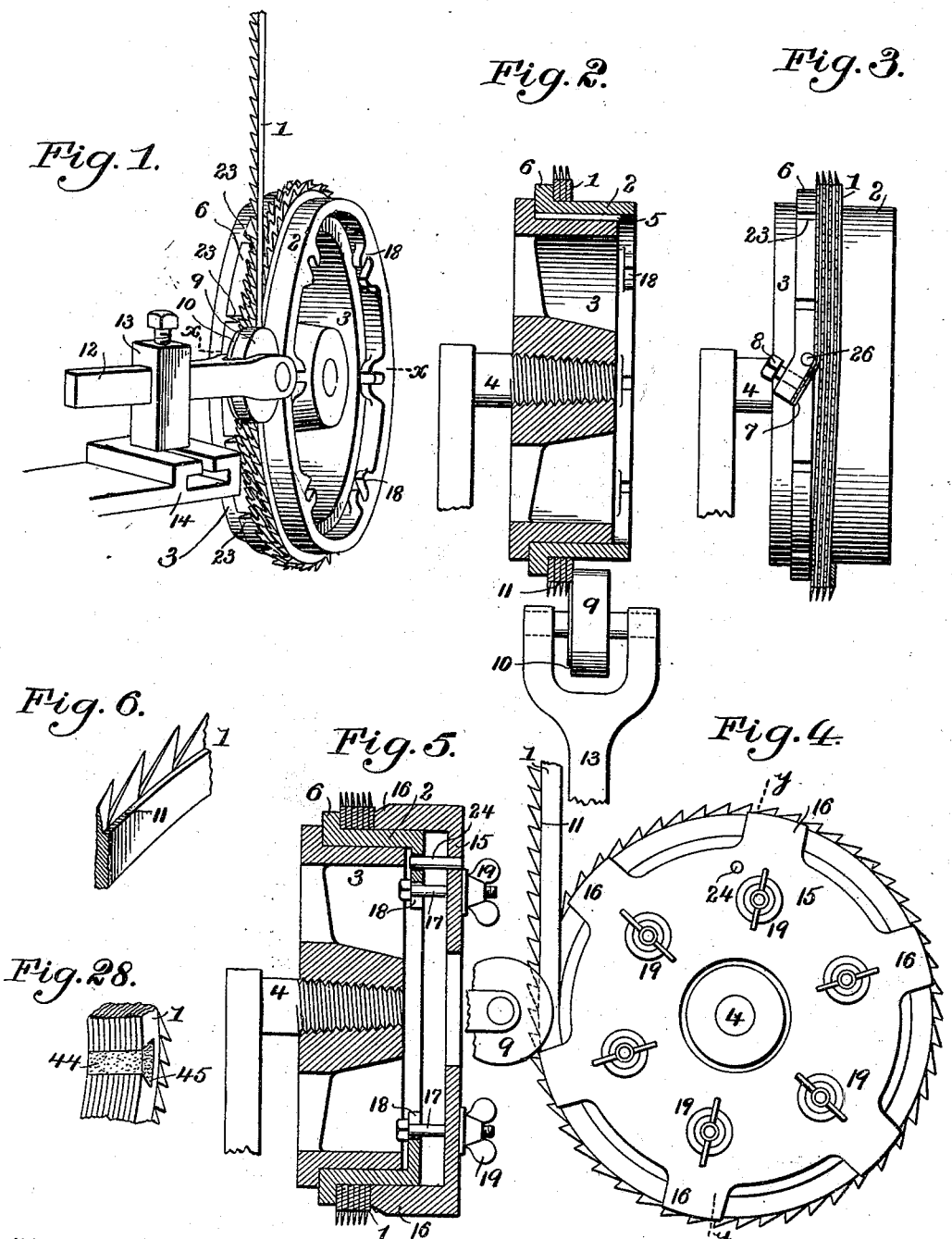

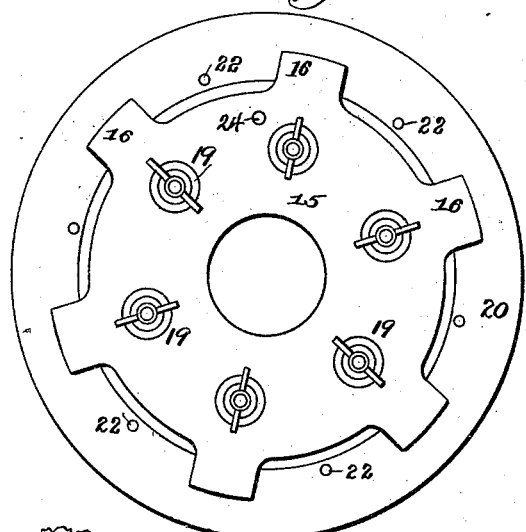
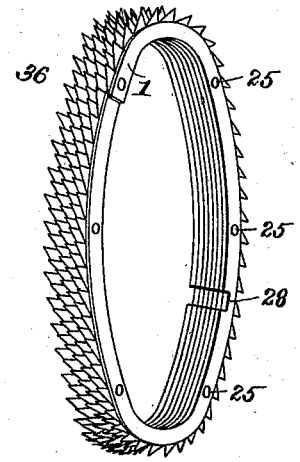
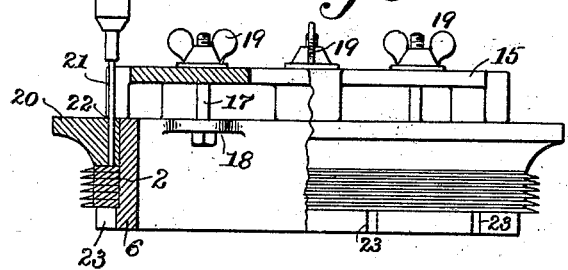
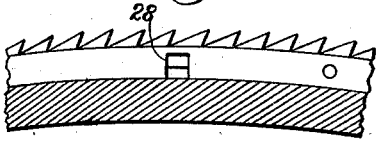
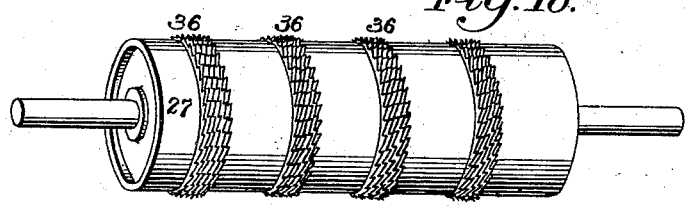
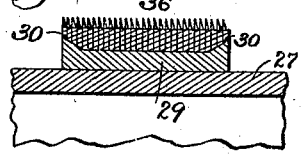
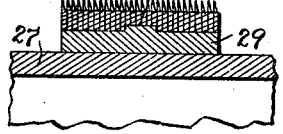
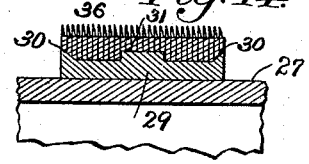

UNITED STATES PATENT OFFICE.

WILLIAM H. CLAY AND JOHN HENRY KNOWLES, OF PHILADELPHIA, PENNSYLVANIA; SAID CLAY ASSIGNOR TO SAID KNOWLES.

METALLIC TOOTHED CYLINDER FOR CARDING OR SIMILAR MACHINES.

SPECIFICATION forming part of Letters Patent No. 542,605, dated July 9, 1895.

Application filed November 6, 1894. Serial No. 528,077. (No model.)

*To all whom it may concern:*

Be it known that we, WILLIAM H. CLAY and JOHN HENRY KNOWLES, of the city and county of Philadelphia and State of Pennsylvania, have invented an Improvement in Metallic Toothed Cylinders for Carding or Similar Machines, of which the following is a specification.

This invention relates to that class of toothed cylinders used on carding and similar machines in which the toothed surface consists of teeth formed in the outer edge of thin metal ribs or laminæ which encircle a central body or shell of the cylinder. In one construction of such cylinders a continuous toothed metal strip has been employed, wound about the cylinder, with its untoothed edge fitting in a spiral groove in the surface of the body-cylinder. This construction has been largely employed, but is open to several objections which necessarily result from the nature of the construction. The formation of the spiral groove produces a standing ridge of metal, which must be of sufficient width and strength to support the toothed strip between the adjacent portions of the groove, and consequently the convolutions of the toothed strip when wound in the groove cannot be brought as close together as is desired. From this it results that cylinders cannot be constructed by this method with as fine surface toothing as is desirable and necessary for some kinds of work. The toothed metal strip must be very thin or it will further increase the coarseness of the toothing beyond that which results from the presence of the standing ridges between the grooves, and consequently when the strips are made thin in order to produce closer surface toothing the teeth are weak and unfitted for continuous service. It is difficult to properly secure the metal strip in the groove. Consequently it is liable to become loose and spring out. This causes damage to the toothing and often to other parts of the machine in which such a toothed cylinder is employed. When the toothing becomes worn or injured the old toothed strip must be removed and replaced by a new strip. In this process the edges of the groove are to a greater or less extent injured in the removal of the strip, and it becomes necessary to pare down the surface of the cylinder and deepen the grooves to receive the new toothed strip. Consequently the cylinder becomes diminished in diameter each time it is reclothed and sooner or later becomes useless and must be replaced by a new cylinder. Our invention is designed to overcome these defects and to provide a toothed cylinder of economical construction in which any desired fineness of toothing may be employed without liability of the toothed ribs to become loose and in which any amount of reclothing is possible without affecting the utility of the body-cylinder.

In carrying out our invention we form an externally-toothed ring or band by means of a series of toothed ribs or layers of thin metal, arranged side by side until the desired width is obtained, and secure these ribs or layers together by riveting or otherwise to form a substantially unitary ring adapted to be slipped upon the body-cylinder. Our preferred method of forming these rings is by means of a continuous toothed strip spirally wound until the desired width is obtained, with the successive convolutions in contact and secured by riveting or otherwise. These rings may be placed upon the body of the cylinder separated a distance apart to form cylinders such as are employed in the doffers of finishing carding-engines, or a series of rings may be placed in contact with one another upon the body of the cylinder to form a continuous toothed surface when that is desired.

It is apparent that the fineness of the toothing produced by our construction is limited only by the thickness of the rib employed and that fine toothing may be produced without using objectionably-thin metal ribs. It is also obvious that the cylinders may be reclothed when desired without injuring the body of the cylinder by simply removing the injured or worn ring or band and replacing it by another and that there is no liability of any rib in any ring becoming loose and springing out, as all of the ribs forming one ring are united together to form a substantially integral piece. If it is desired to form coarse toothing intermediate untoothed spacing-ribs may be employed with the toothed ribs, being riveted or otherwise secured with the toothed ribs to form the unitary ring.

We shall now refer to the accompanying drawings for the purpose of describing our improvements with greater particularity.

Figure 1 is a perspective view of apparatus for constructing the externally-toothed ring, showing our preferred method of constructing the same. Fig. 2 is a horizontal sectional view on the line x x of Fig. 1. Fig. 3 is a top view of part of the apparatus shown in Fig. 1. Fig. 4 is an end elevation of the same apparatus with the clamp-plate applied. Fig. 5 is a transverse sectional view of the same on the line y y of Fig. 4. Fig. 6 is a perspective view of a portion of the metallic toothed strip. Fig. 7 is an end elevation of the clamp and drilling-jig. Fig. 8 is a side elevation of the same, with part in vertical section. Fig. 9 is a perspective view of one of the completed toothed rings. Fig. 10 is a perspective view of a doffer-cylinder having the rings applied. Fig. 11 is a transverse sectional view of a part of the doffer-cylinder enlarged, showing a method of fastening the toothed ring to the body of the cylinder. Figs. 12 to 22, inclusive, are sectional views of portions of cylinders, showing different methods which may be employed for fastening the toothed rings to the body or shell. Fig. 23 is a perspective view of a cylinder having a continuous toothed surface. Fig. 24 is a longitudinal vertical sectional view of part of the cylinder shown in Fig. 23. Fig. 25 is a plan view of a toothed rib formed of a continuous circular piece of metal, such as may be employed in a modified construction of our improved rings. Fig. 26 is a side view of the same, together with a circular spacing-piece. Fig. 27 is a side elevation of a toothed ring composed of the circular pieces shown in Figs. 25 and 26; and Fig. 28 is a perspective view of a portion of one of our improved toothed rings, illustrating a modification in the manner of securing the toothed ribs together to form the ring.

In our preferred construction, as has been stated, the toothed ring is formed from a continuous strip of toothed metal. This continuous strip of metal 1 is spirally wound about a mandrel 2, having a diameter equal to the internal diameter of the toothed ring which is to be made. The mandrel 2 is carried by a suitably-shaped face-plate 3, secured to a lathe-mandrel 4, and is held against movement on the face-plate by a suitable key 5. The mandrel 2 is provided with an annular flange 6, against which the toothed strip bears while it is being wound. The end of the strip may be suitably secured to the mandrel, so as to be wound thereon when the mandrel is rotated. For this purpose I have shown the mandrel provided with a slot 7 in the flange 6 to receive the end of the strip and a set-screw 8 to clamp the end of the strip in the slot. When the lathe is rotated and the mandrel 2 turns the toothed strip will be wound spirally on edge upon the periphery of the mandrel with the side faces of adjacent convolutions in contact. While the toothed strip is being thus wound it should be kept under heavy tension by suitable devices, which are not shown, as they are well known in the art. To assist in winding the strip about the mandrel, a pressure guiding-disk 9 may be employed. This disk is adapted to bear laterally against the side of the metal strip as it is being wound, and to aid in bending the strip about the mandrel it may be provided with an annular shoulder 10, adapted to engage the usual shoulder 11 along the outer face of the body of the strip 1, adjacent to the teeth formed in the edge of the strip. The shoulder 10 acting on the shoulder 11 of the strip will bend the strip and cause it to more readily conform to the periphery of the mandrel 2. We have shown the disk 9 loosely journaled in an arm 12 adjustably mounted in an upright post 13, held in a frame 14, which forms part of the usual traveling carriage of the lathe. The winding operation is continued until the toothed strip has been wound to the width desired for the ring which is to be made. The mandrel is then stopped, and while the toothed strip is still under tension, so as to prevent the wound portion becoming loose or springing out from contact with the periphery of the mandrel, the clamp-plate 15 is applied. As shown, this clamp-plate 15 consists of a suitable body provided with a series of clamping-lugs 16, adapted when the plate is applied over the face of the mandrel 2 to bear upon the exposed side face of the toothed wire wound thereon. The plate 15 may be clamped on the mandrel 2 in any suitable manner, as by the clamping-bolts 17 carried by the plate 15 and engaging lugs 18 projecting inwardly from the body of the mandrel 2. By means of thumb-nuts 19 the plate 15 may be drawn toward the mandrel 2, so as to clamp the wound strip firmly between the flange 6 and the clamping-lugs 16. The toothed strip 1 is now cut at or near the point where it leads onto the mandrel 2, and the mandrel 2 and clamp 15, with the wound strip between them, are removed from the face-plate 3. An annular drilling-jig 20 is slipped over the clamp 15 and rests upon the faces of the wound strip exposed between the clamping-lugs 16. Holes 25 are now drilled transversely through the body of the wound strip 1, as by drills 21 passing through drilling-holes 22 in the jig 20. The flange 6 of the mandrel 2 may be provided with recesses or apertures 23 to receive the drills 21 when they pierce the wound strip, and to properly center the clamping-plate 15 with reference to these recesses or apertures 23, so that when the drilling-jig 20 is applied the drilling-holes 22 therein will register with the apertures 23, a centering pin or dowel 24 may be employed, carried by one of the parts and engaging a recess or aperture in the other, as is shown in Fig. 5.

After the drilling operation has been performed and the drilling-jig 20 has been removed rivets are inserted through the holes formed in the wound strip and are suitably secured in the manner well known in riveting machinery. The holes 25 may be countersunk at their ends to receive the heads and riveted ends of the rivets. The wound strip is thus formed into a single unitary toothed ring 36 of the desired width, composed of the series of convolutions of the spirally-wound strip. The end of the strip which was clamped to the mandrel 2 when the winding operation was commenced is severed, the clamp 15 is removed, and the finished ring is drawn from the mandrel. The severance of the clamped end of the strip may be accomplished by means of a file passing through the file-slot 26 in the flange 6 of the mandrel. (See Fig. 3.)

Any desired number of like or duplicate rings may be produced by successive repetitions of the processes described. The rings thus formed are slipped on the body 27 of the cylinder and are fastened thereto in such positions and in such number as the character of the cylinder may require. It is obvious that different means may be employed for securing the rings on the cylinder, and in the drawings we have shown a number of different constructions. In some cases it may not be necessary to employ any means for securing the rings in place other than the frictional contact between the inner surface of the ring and the periphery of the body-cylinder, but generally such additional means are desirable, and therefore we have shown them. It is to be understood, however, that they may be used or not, as may be desired.

Our preferred method of securing the rings to the body-cylinder is to form a transverse keyway 28 on the inner face of the ring (see Figs. 9 and 11) and to insert in this keyway a key 29 made of lead or other soft metal, which will hold the ring in place by frictional contact on the cylinder. To prevent the key becoming loose in the keyway the latter may be formed with chamfered edges 30, as in Fig. 12, or with an interior recess 31, as in Fig. 13, or with both, as in Fig. 14, and the soft-metal key may be upset or riveted, so as to enter the edges or recesses and thus become secured. The soft-metal key, when crowded into the keyway by the upsetting or riveting process, pushes against the smooth surface of the cylinder and takes a firm frictional hold thereon and at the same time draws that side of the ring opposite the key more firmly against the body-cylinder than before the key was upset and thereby increases the frictional hold of the ring upon that side of the cylinder. Thus by these combined frictional influences of the key and the said side of the ring the ring is secured to the body-cylinder in most instances with complete practical efficiency.

In some cases it may be desirable to positively secure the key to the body-cylinder, for which purpose the surface of the body-cylinder may be formed with one or more pits or recesses 32 to receive a portion of the metal of the key 29 when it is upset. This construction is shown in Figs. 15, 16, and 17. Or the cylinder may be provided with a groove, as in Fig. 18, to receive the key. Instead of forming a transverse keyway in the ring a soft-metal strip or piece 33 may be inserted in a groove or recess 34 in the body-cylinder, Fig. 20, and this soft-metal strip may be raised to enter notches formed at the sides of the ring to secure it in place, as in Fig. 19, or hard-metal wedges 35 may be driven into the soft metal adjacent to the edges of the ring, as in Fig. 21.

In Fig. 10 is shown a cylinder such as is used for the doffers of finishing-cards in which the independent externally-toothed rings are mounted on the body-cylinder with intervening blank or untoothed spaces between adjacent rings.

In Fig. 22 is shown a doffer-cylinder in which the rings 36 are held in place by intermediate collars 37 and outer collars 38, which may be secured in any suitable way.

In Fig. 23 is shown a cylinder having a continuous toothed surface. In forming this cylinder a series of rings 36 are placed on the cylinder-body 27 immediately adjacent to one another, without intermediate spaces, and the rings may be secured in any desirable manner.

In Fig. 24 we have shown the outer ring at one end bearing against a flange 39 on one end of the cylinder and a feather or spline 40 on the cylinder extending longitudinally through the keyways in the series of rings. The rings are shown locked by a flange-plate 41 on the other end of the cylinder.

Instead of forming the rings 36 of a continuous spirally-wound toothed strip 1 they may be formed of a series of independent circular toothed pieces 42, Fig. 25, which may be placed upon the mandrel 2, one against another, until the desired width is obtained, and then clamped, drilled, and riveted, as in the manner of constructing the rings from the continuous spirally-wound strip. These pieces 42 may be provided with annular shoulders, as in the case of the continuous strip 1, to space the teeth, or intermediate untoothed pieces 43, Fig. 26, may be employed. In Fig. 27 we have shown a toothed ring 36 formed of these circular toothed pieces 42 and spacing-blanks 43. If it is desired to make a ring with coarse toothing from the continuous strip 1, a blank strip may be wound with it on the mandrel 2, lying with its convolutions between the convolutions of the toothed strip 1. Instead of riveting the toothed ribs to form the unitary ring they may be united in any other suitable manner.

In Fig. 28 we have illustrated a modification in which the ribs are secured together by means of solder 44 introduced in grooves 45 formed transversely through the ring.

We do not mean to limit ourselves to the minor details of construction, which have been shown for purposes of illustration, as it is apparent that they may be varied without in any way affecting our invention, as hereinafter specified.

We are aware that independent externally toothed rings have been used in this art in which a solid metallic body has been employed, upon the outer surface of which a spiral groove has been cut and a toothed strip wound and secured into the groove to constitute the independent ring. A number of rings so constructed have been placed on a cylindrical body or shell to form the toothed cylinder. Rings so constructed are, practically, but a series of short sections of any ordinary cylinder, such as we have described in the commencement of this specification, and are open to all the objections there pointed out, and also to certain other objections peculiar to the ring as so constructed, a few of which we will mention.

The solid-bodied rings cannot be produced in duplicate, and only by extraordinary skill can they be produced even approximately so. The main essential is that the rings be all of one diameter at the points of the toothing. The toothed strip employed in all of the rings is of one exact width, from the back of the strip to the points of the teeth throughout its entire length. In order to produce rings having the same external diameter the diameter of the rings at the bottoms of the grooves which receive the strip must in all of the rings be the same. In the practical production of such rings the body-rings are first turned to an external diameter as nearly as possible the size of a standard callipering-gage. Then the grooves are cut to a depth from the turned surface indicated by a depth-gage. Owing to the extreme narrowness of the grooves it is not practical to actually calliper the diameter of the rings at the bottoms of the grooves. Because of the system of double measurements described to get the bottoms of the grooves the right diameter and the lack of perfection even in the most skilled manipulation rings cannot be practically produced having the bottoms of the grooves in all of the rings of uniform diameter. Consequently the finished toothed rings produced will not be of uniform diameter at the points of the teeth of the toothing. To remedy this defect after all of the rings which are to go on any given body-cylinder have been placed upon it it becomes necessary to reduce the diameter of all of the rings upon that body-cylinder to the same size. To accomplish this the points of the teeth in the rings are by proper machinery ground or topped off to reduce all of the rings on that cylinder to the size of the ring upon it of least diameter. This process is objectionable because the teeth when ground away become flat on the points and their working efficiency is thereby reduced. No system has as yet been devised by which such rings can be independently reduced to a uniform diameter by such grinding or topping-off process. Consequently the rings of each cylinder must be specially ground to reduce the rings which compose that cylinder to one diameter. For the reasons stated, after such a cylinder has been removed from the shop to the factory, if for any purpose, as to replace a ring injured by accident, it is desired to place another ring on the cylinder such a ring cannot be procured from the shop and applied to the cylinder at the factory with certainty of its being an exact duplicate of the ring removed. Hence it is usual to return the entire cylinder to the shop to have the new ring applied and its diameter adjusted to that of the other rings upon the cylinder. In producing the rings shown in the drawings the toothed strips are wound all on one or exact duplicate mandrels and the rings are automatically and without special skill produced all of exactly the same external diameter and may be applied to the body-shell at any time with certainty of exact correspondence between companion rings.

The solid-bodied rings are much heavier than the unitary rings herein described, and consequently the cylinder produced therefrom is more weighty and less desirable for the purpose for which such cylinders are used.

The solid-bodied rings are more expensive than the rings claimed in this invention. The solid bodies of the rings are made usually of cast-iron. To procure castings for all the different diameters and widths of rings required in this art necessitates a very great number of delicate and expensive patterns to make the castings from. No patterns are required for the rings herein described. The diameter of the ring is determined by the diameter of the master-mandrel and the width by the number of times that the strip is wound about the mandrel.

The solid-bodied ring must have its body bored out, turned, and grooved on the outside and its edges squared up, all operations requiring skilled labor. None of these processes are required in producing the improved ring shown herein. Certain processes, as the securing of the folds of the spirally-wound strip, are required in producing the improved ring, which are not required in producing the solid-bodied ring; but these processes are more simple and are performed at less cost than the processes named as being required specially for the solid-bodied ring.

Having now described our invention, what we claim as new, and desire to secure by Letters Patent, is—

1. In a toothed cylinder for carding and similar machines, the combination with the body or shell of the cylinder, of a series of independent toothed rings, each composed of thin annular layers of externally toothed metal fastened together through their body portions to form a single independent unitary ring composed solely of the united layers and their fastenings, and each provided with a keyway cut across the interior surface, and soft metal keys passed through said keyways and upset or riveted therein so as to bind the rings upon the body or shell.

2. In a toothed cylinder for carding and similar machines, the combination, with the body or shell of the cylinder, of a series of independent externally toothed metallic rings each ring consisting of thin metal ribs or laminæ having teeth formed in their outer edges secured together, so as to form a single unitary toothed ring, a keyway cut across the interior surface of each of the rings, soft metal keys passed through said keyways and upset or riveted therein so as to bind the rings upon the said body or shell, and pits or spaces formed in the surface of said body or shell below the said keys to receive a portion of the metal of each key when it is upset or riveted and thereby prevent the rings or any of them from slipping on the body or shell.

3. As an article of manufacture, an externally toothed detachable ring for the cylinders of carding engines, &c., composed of a continuous strip of metal, toothed on its outer edge and having an untoothed or blank margin below its toothed edge, spirally wound with adjacent folds of the spirally wound strip in contact, and secured each to the other so that the blank margin of the strip will constitute the body and inner surface of the ring, and the toothed edge of the strip the external toothed surface of the ring, the whole forming a single unitary ring adapted to be secured to the body cylinder, or to be removed therefrom for the purpose described.

4. As an article of manufacture, a toothed detachable ring for cylinders of carding and similar machines, composed of thin annular externally toothed layers of metal secured by fastenings which pass through their body portions to form a single, independent, unitary ring, composed solely of the united layers and their fastenings, adapted to be secured to the body part of a cylinder, or to be removed therefrom for the purpose described.

5. In a toothed cylinder for carding and similar machines, the combination, with the body or shell of the cylinder, of a series of independent externally toothed metallic rings each ring consisting of a continuous strip of metal having teeth formed in one edge of the strip, wound substantially as described in a spiral with the faces of adjacent folds of the spirally wound strip in contact and having the said folds secured together by fastenings so as to form a single unitary toothed ring consisting only of the folds of the spirally wound toothed strip and their fastenings, a keyway cut across the interior surface of each of the rings and soft metal keys passed through said keyways and upset or riveted therein so as to bind the rings upon the said body or shell.

6. In a toothed cylinder for carding and similar machines, the combination, with the body or shell of the cylinder, of a series of independent externally toothed metallic rings each ring consisting of a continuous strip of metal having teeth formed in one edge of the strip, wound substantially as described in a spiral with the faces of adjacent folds of the spirally wound strip in contact and having the said folds secured together by fastenings so as to form a single unitary toothed ring consisting only of the folds of the spirally wound toothed strip and their fastenings, a keyway cut across the interior surface of each of the rings, soft metal keys passed through said keyways and upset or riveted therein so as to bind the rings upon the said body or shell, and pits or spaces formed in the surface of said body or shell below said keys to receive a portion of the metal of each key when it is upset or riveted and thereby prevent the rings or any of them from slipping on the body or shell.

7. In a toothed cylinder for carding and similar machines, the combination with the body or shell of the cylinder, of a series of independent externally toothed metallic rings each ring consisting of a continuous strip of metal having teeth formed in one edge of the strip and having an untoothed or blank margin below the toothed edge of the strip, the said strip being wound on edge in a spiral to form the ring and the folds of the spirally wound strip being secured by rivets passing through the blank margin of the strip and riveted so as to form a single unitary ring consisting only of the folds of the spirally wound toothed strip and the rivets which secure the folds, a keyway cut across the interior surface of each of the rings, soft metal keys passed through said keyways and upset or riveted therein so as to bind the rings upon the said body or shell, and pits or spaces formed in the surface of said body or shell below the said keys to receive a portion of the metal of each key when it is upset or riveted and thereby prevent the rings or any of them from slipping on the body or shell.

8. A cylinder or roll for carding and similar machines, comprising a smooth surfaced cylindrical body having mounted thereon a series of detachable externally toothed rings or bands, each ring or band consisting of a single strip of thin metal, toothed upon one edge, and wound in a spiral with adjacent folds of the spirally wound strip in contact, and secured each to the other, and having the untoothed edges of the folds of the spirally wound strip which constitutes the ring or band in contact with the body of the cylinder or roll.

In testimony of which invention we hereunto set our hands.

WILLIAM H. CLAY.
JOHN HENRY KNOWLES.

Witnesses:
ERNEST HOWARD HUNTER,
C. H. NEWCOMB.